United States Patent [19]
Christopher

[11] 3,848,895
[45] Nov. 19, 1974

[54] ANY ANGLE HITCH ATTACHMENT
[76] Inventor: Roland L. Christopher, Creston Star Rt., Paso Robles, Calif. 93446
[22] Filed: Sept. 18, 1973
[21] Appl. No.: 398,482

[52] U.S. Cl.............................. 280/478 R, 280/491 F
[51] Int. Cl................................................ B60d 1/16
[58] Field of Search ........ 280/478 R, 478 A, 478 B, 280/477, 491, 415 A, 511

[56] References Cited
UNITED STATES PATENTS

| | | | |
|---|---|---|---|
| 2,150,010 | 3/1939 | Solomon | 280/477 |
| 2,170,983 | 8/1939 | Adams | 280/478 R |
| 2,736,575 | 2/1956 | Gebhart | 280/477 |
| 2,753,192 | 7/1956 | Davis et al. | 280/477 |
| 3,345,082 | 10/1967 | Atkins | 280/477 |

Primary Examiner—Leo Friaglia
Assistant Examiner—Randall Schrecengost

[57] ABSTRACT

An improved trailer hitch, and which has the advantage of being at any angle respective to a trailer hitch ball during coupling operation, the device consisting of a tubular housing having a winch for pulling a cable connected to a socket placeable over the trailer hitch ball so to pull the ball into the tubular housing and secure the ball and the socket behind a latch.

5 Claims, 3 Drawing Figures

PATENTED NOV 19 1974 3,848,895

ANY ANGLE HITCH ATTACHMENT

This invention relates generally to trailer hitches.

A principal object of the present invention is to provide an improved trailer hitch which is operative at any angle respective to a trailer hitch ball during a coupling operation.

Yet another object of the present invention is to provide an any angle hitch attachment which can be quickly and easily operated to couple or uncouple a towed vehicle to a towing vehicle.

Other objects of the present invention are to provide an any angle hitch attachment which is simple in design, inexpensive to manufacture, rugged in construction, easy to use and efficient in operation.

These and other objects will be readily evident upon a study of the following specification and the accompanying drawing, wherein.

Figure 1:
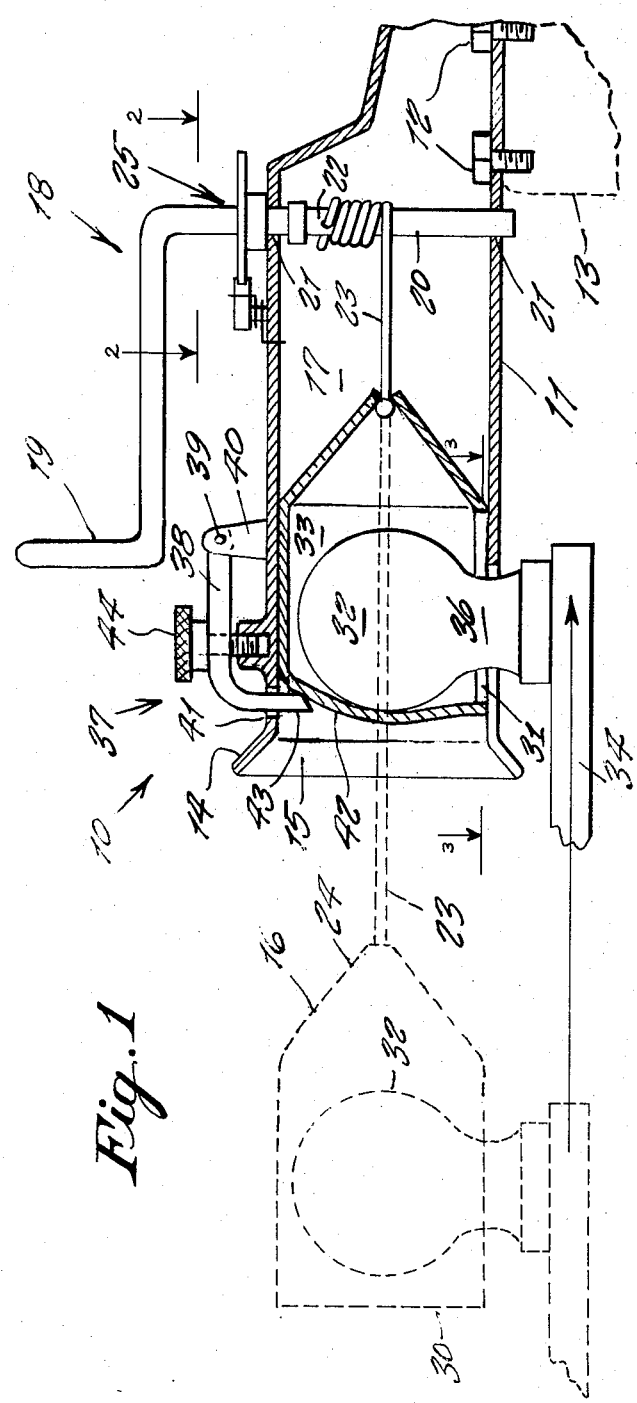
FIG. 1 is a side cross-sectional view of the present invention, and showing in dotted lines an alternate position.
Figure 3:
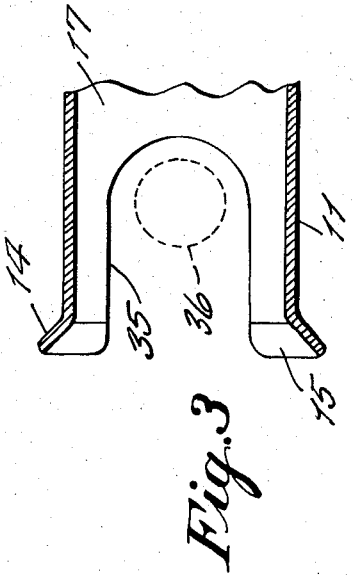
FIG. 3 is a cross-sectional view in direction 3—3 of FIG. 1.
Figure 2:
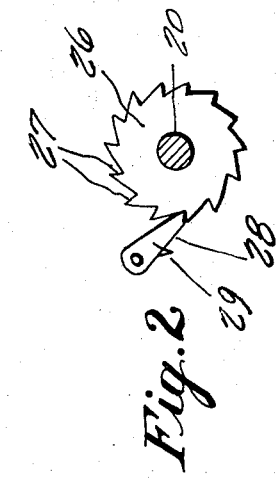
FIG. 2 is a cross-sectional view in direction 2—2 of FIG. 1.

Referring now to the drawing in detail, the reference numeral 10 represents an any angle hitch attachment according to the present invention wherein the same includes a tubular housing 11 which is attachable by means of bolts 12 to a towing vehicle 13 at its rear end. The rear end of the tubular housing 11 is outwardly flared as shown at 14 to form a wide mouth 15 for easily guiding the entering of a socket 16 into the interior 17 of the tubular housing.

The tubular housing incorporates a winch 18 that includes a crank handle 19 integral with a shaft 20 extending transversely through the housing 11 and which is retatable within bearings 21 of the housing 11. An opening 22 transverse in shaft 20 is adaptable to have one end of cable 23 fitted therethrough for securement, the opposite end of the cable being attached to a conical front end 24 of the socket 16 as shown. A ratchet mechanism 25 incorporated with winch 18 includes a toothed ratchet wheel 26 rigidly secured to the shaft 20 so to rotate therewith, the ratchet wheel 26 having a plurality of ratchet teeth 27 for selectively being engaged by a pawl 28 that is biased by a spring 29 so to normally maintain engagement of the pawl respective to the ratchet teeth.

The socket 16 comprises a shell 30 of generally cylindrical configuration adjacent the conical portion thereof, a side of the cylindrical portion having an opening 31 so to allow entry of a hitch ball 32 into the interior 33 of the socket. The hitch ball 32 is attached to a trailer hitch tongue 34 as shown.

A longitudinal notch 35 on the tubular housing extends from the flared end and serves to permit a neck 36 of the ball 32 to be moveable along the notch during engagement of the ball with the trailer hitch.

In operative use, it is now evident as shown by the dotted lines of FIG. 1 that in coupling the ball to the trailer hitch, the socket 16 is fitted over the ball 32 by inserting the ball through the opening 31. The crank handle 19 is then rotated, thus causing the socket to be pulled by the cable 23 thus urging the ball 32 toward the hitch. The conical end 24 of the socket first enters the flared mouth of the housing 11 and continued rotation of the crank handle 19 causes the neck of the ball to advance along the slot or notch 35 of the housing thus allowing the cylindrical portion of the socket to enter the interior 17 of the housing 11. After the socket and ball are fully within the interior of the housing, as shown in FIG. 1, a latch mechanism 37 then secures the socket and ball so to prevent accidental disengagement. The latch mechanism 37 includes a latch arm 38 pivotable about pin 39 secured in post 40 integrally incorporated with the housing 11, the latch arm 38 being adaptable to be received through opening 41 in a side of the housing so that the terminal end of the latch arm rest against the rear side 42 of the socket as shown at 43 thus preventing the socket to accidentally come out of the housing interior 17. A latch screw 44 screws down to retain the latch arm 38 and prevents the same from accidentally pivoting outward of the opening 41. Thus a secure attachment is provided.

What I now claim is:

1. In a trailer hitch, in combination: a trailer tongue and a coupling ball having a reduced neck secured to and projecting upwardly from said tongue; a socket having a bottom opening through which said ball is freely receivable to couple said ball and socket; a tubular housing attachable to a towing vehicle, said housing having at its rear end an open mouth for entry of the coupled ball and socket, and having in its bottom a longitudinal slot in open communication with said mouth so as to receive said reduced neck while said socket is received in said housing, said socket having at its forward end a nose so related to said open mouth of the housing as to provide for easy entry of the socket into the housing; a winch carried by said housing, and a cable attached to said nose and adapted to be wound upon said winch to draw the coupled ball and socket into the housing.

2. A trailer hitch as defined in claim 1, wherein said housing has at its rear end an outwardly flared bell defining its said open mouth, and wherein said socket nose is tapered to facilitate entry through said mouth.

3. A trailer hitch as defined in claim 2, wherein said socket is of shell form, including a cylindrical body and a closed rear end for towing engagement against said ball, said tapered nose being conical, and said housing being cylindrical to receive said cylindrical socket body.

4. A trailer hitch as defined in claim 3, wherein said closed rear end of the socket is dished rearwardly to provide a hollow in which said ball is receivable.

5. A trailer hitch as defined in claim 4, including a latch having a finger projecting through an opening in said housing and engageable behind said socket to retain the socket in the housing.

* * * * *